(No Model.)

H. S. COLE.
ROPE CLAMP.

No. 291,693. Patented Jan. 8, 1884.

Attest.
P. H. Leviitcd
W. H. Pinin

Inventor.
Henry S. Cole.
pr R. T. Osgood,
atty.

United States Patent Office.

HENRY S. COLE, OF SPENCERPORT, NEW YORK.

ROPE-CLAMP.

SPECIFICATION forming part of Letters Patent No. 291,693, dated January 8, 1884.

Application filed November 8, 1883. (No model.)

*To all whom it may concern:*

Be it known that I, HENRY S. COLE, of Spencerport, in the county of Monroe and State of New York, have invented a certain new and useful Improvement in Rope-Clamps; and I do hereby declare that the following is a full, clear, and exact description of the same, reference being had to the accompanying drawings, in which—

Figure 1:
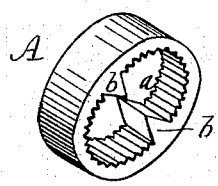
Figure 2:
Figure 3:
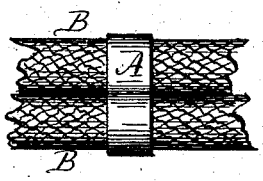
Figure 4:
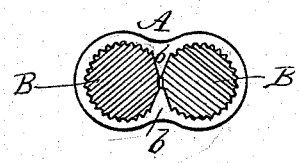

Figure 1 is a perspective view of the clamp. Fig. 2 is a plan or edge view. Fig. 3 is a view of the device clamped to rope. Fig. 4 is a cross-section of Fig. 3.

My improvement relates to metallic clamps for securing ropes; and it consists of a clamp corrugated or ribbed on its inner periphery and provided with spurs, as and for the purpose hereinafter described.

In the drawings, A shows the clamp, which consists of a ring made either of oval or circular form. It is preferably made of malleable iron, but may be made of wrought-iron, brass, or any other suitable material.

*a a* are corrugations or ribs on the inner periphery of the ring; and *b b* are wedge-shaped spurs, also on the inner periphery, and located midway of the ring opposite each other. The corrugations preferably stand crosswise of the ring, but, if desired, may extend longitudinally or circumferentially or cross each other angularly.

In use the ropes B B are passed through the ring, and the ring is then bent or crushed down in the center, as shown in Fig. 2. This causes the wedge-shaped spurs *b b* to pass between the lengths of the rope and force them apart and against the corrugated sides, which hug closely to the rope. The sharp-edged corrugations act as teeth to hold the rope, and, by being close together and extending around the whole interior of the ring, produce the necessary friction to prevent slipping. The wedge-shaped spurs *b b* serve the important purpose of spreading the rope and producing the tightening action. This clamp may be used for securing two separate ropes or the ends of a single rope. It may be used for a great variety of purposes—for instance, in rope halters, on hammock-fastenings, cordage, &c.

What I claim is—

As a new article of manufacture, a rope-clamp consisting of a metal ring corrugated or ribbed on its inner side, and provided with wedge-shaped spurs which serve as dividers or clamps to the rope when the ring is bent or crushed together, as herein shown and described.

In witness whereof I have hereunto signed my name in the presence of two subscribing witnesses.

HENRY S. COLE.

Witnesses:
R. F. OSGOOD,
WM. J. MCPHERSON.